Sept. 15, 1942.   R. B. COTTRELL   2,295,550
QUICK WHEEL CHANGE TRUCK
Filed Dec. 21, 1940   2 Sheets-Sheet 1

INVENTOR.
Robert B. Cottrell,
BY
atty.

Sept. 15, 1942.  R. B. COTTRELL  2,295,550
QUICK WHEEL CHANGE TRUCK
Filed Dec. 21, 1940  2 Sheets-Sheet 2

INVENTOR.
Robert B. Cottrell,
BY
atty

Patented Sept. 15, 1942

2,295,550

UNITED STATES PATENT OFFICE 2,295,550

QUICK WHEEL CHANGE TRUCK

Robert B. Cottrell, Chicago, Ill., assignor to American Steel Foundries, Chicago, Ill., a corporation of New Jersey Application December 21, 1940, Serial No. 371,097

28 Claims. (Cl. 105—197)

My invention relates to a railway car truck and more specifically to a four wheel truck of the quick wheel change type wherein the bolster and side frame are so interlocked that it is a relatively simple mechanical process to release the bolster from the side frame in order to permit the removal of the wheels.

An object of my invention is such a form of connection between the side frame and the bolster in a four wheel railway car truck as will not only facilitate its assembly and dismantling but will also incorporate a novel form of ride control unit which serves as a damper for the coil springs which otherwise normally may set up damaging synchronous oscillations.

A definite object of my invention is to devise a novel form of interlocking arrangement between a side frame and a bolster in a quick wheel change truck comprising a novel form of interlocking member which may be countersunk in the bottom wall of the bolster and formed with arms projecting between the inboard and outboard portions of adjacent columns to serve as actuating means for associated friction shoes which may be mounted in the side frame outwardly of each column.

My invention comprehends a novel method of connecting the ride control unit to the side frame in such manner that it may readily be inspected while in use or disconnected when desired for application of new friction shoes or other parts.

My invention contemplates such an arrangement as that described wherein the side frame, the bolster, and the insert member are specifically designed to accommodate modern foundry practice and to meet the test requirements and operating conditions imposed on modern high-speed freight cars.

Figure 3:
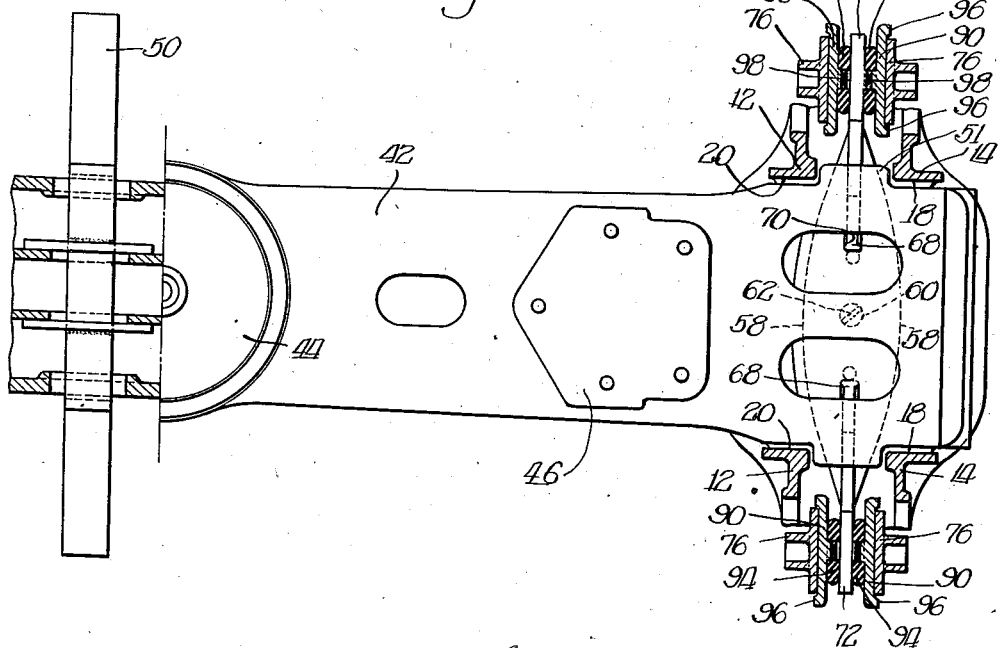
Figure 3 is a top plan view of the truck structure shown in Figures 1 and 2, partly in section, the section being taken substantially in the horizontal plane indicated by the line 3—3 of Figure 1.
Figure 4:
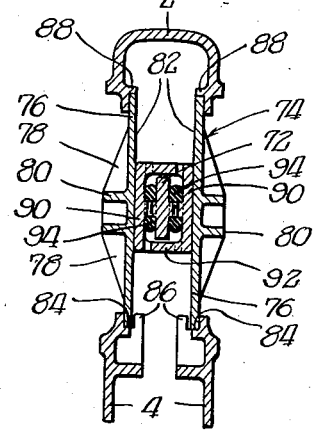
Figure 4 is a sectional view through the ride control device at one side of the truck, the section being taken in the transverse vertical plane indicated by the line 4—4 of Figure 1.

Describing my novel truck arrangement in greater detail, the truck structure comprises the side frame of truss type with the compression member 2, the tension member 4, and spaced columns 6, 6 merging with said tension and compression members to form the central bolster opening 8 and spaced window openings 9, 9, said tension and compression members also merging adjacent their corresponding ends with the integrally formed journal box 10. The central part of each column 6 is formed with an inboard leg 12 and an outboard leg 14 of L-section as may best be seen from the sectional view of Figure 3. The inboard and outboard L-sections 12 and 14 of each column together with the top and bottom web portions of the column define a rectangular opening 16, said rectangular openings of respective columns being aligned longitudinally of the side frame. The opposite faces of the inboard and outboard L-section portions of the respective spaced columns form outboard and inboard bolster guide surfaces as indicated respectively at 18, 18 and 20, 20 in the top plan view of Figure 3.

Figure 2:
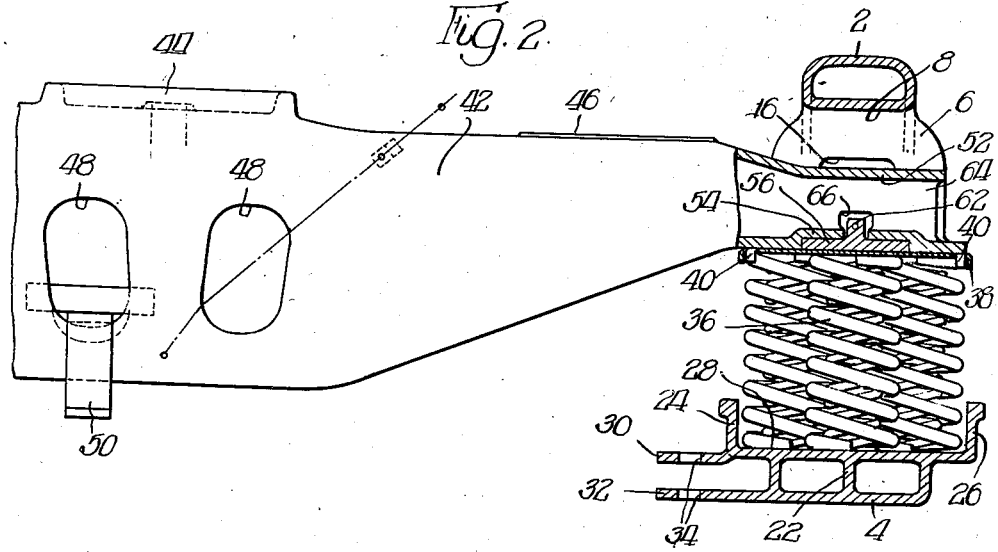
Figure 2 is a transverse sectional view through the truck arrangement shown in Figure 1 with the major portion of the bolster shown in elevation, the section being taken substantially in the vertical plane bisecting the truck transversely as indicated by the line 2—2 of Figure 1.

The compression member above the bolster opening may be of generally box-section (Figure 2), and beneath said bolster opening the tension member may be of box-section with the central longitudinal reinforcing web 22 and with the top wall widened and formed with upstanding inboard and outboard flanges 24 and 26 defining the spring seat 28. Inboard of the spring seat and integral with said tension member box-section may be formed spaced lugs 30 and 32 with aligned openings 34, 34 to which may be secured a tie bar extending to a similar connection at the opposite side of the truck. Positioned on the spring seat 28 of the tension member in said bolster opening may be a spring group generally designated 36 and comprising a plurality of coil springs of relatively long travel, said springs being retained in normal relationship not only by the confining flanges on the tension member but also by a top spring plate 38 held in position as at 40, 40 by lugs downwardly projecting from the associated bolster 42 and interlocked therewith.

The bolster 42 is of usual box-section structure including the center bearing 44 and the side bearing 46 and, as shown, is formed with aligned central openings 48, 48 in the side walls thereof permitting associated brake rods to extend therethrough. The bolster is shown also with brake beam safety support means 50 in the form of a flat rod extending through certain of said aligned openings.

Figure 1:
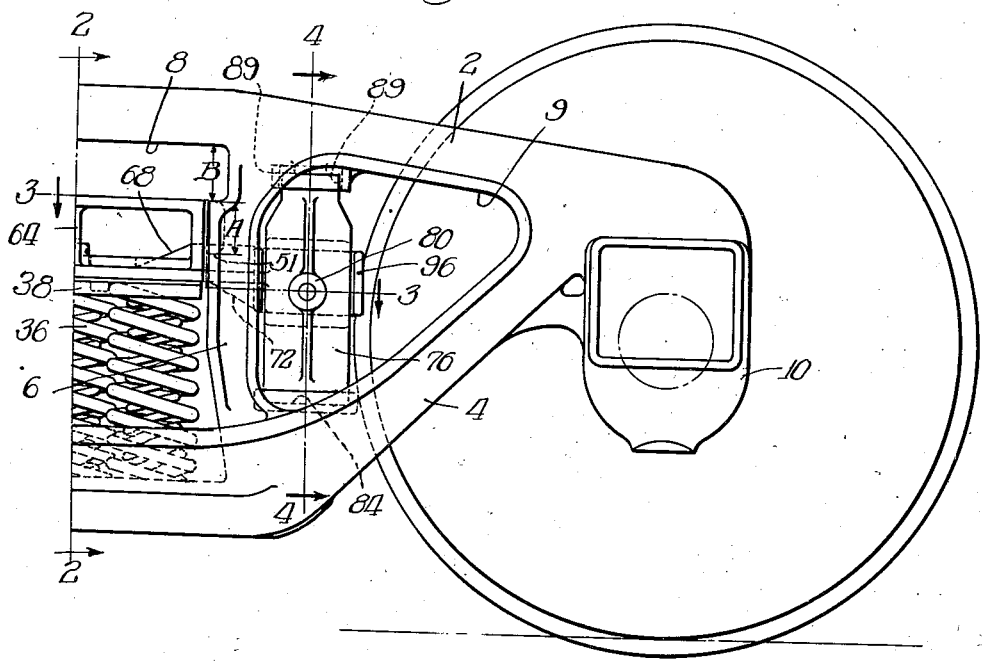
Figure 1 is a side elevation of a four wheel railway freight car truck embodying my invention, only one-half the truck structure being shown inasmuch as the arrangement is similar at opposite ends.

The bolster end, like the main body thereof, is of rectangular box-section including the substantially horizontal top wall 52 and the bottom wall 54. On each side wall of the bolster and adjacent the upper edge thereof may be formed a bolster guide lug or pad 51, said pad extending between the legs of the adjacent column (Figure 3) and having a depth A (Figure 1) slightly less than the depth B of the widest portion of the bolster opening 8 thereabove so that said bolster may be conveniently assembled with or dissociated from the side frame in a wheel change operation. The bottom wall is recessed upwardly centrally of the end portion and transversely thereof to receive the plate or insert member 56, the recess in the bottom of said bolster conforming to the shape of said plate 56 which is formed with arcuate edges as best seen at 58, 58 in the top plan view of Figure 3. Thus, the bottom wall 54 of the bolster and the plate 56 present even bottom faces which are normally seated on the flat top spring plate 38. The plate 56 is formed with an upwardly projecting central lug 60 which extends through the bottom wall 54 of the bolster and may conveniently be keyed therein as indicated at 62. The box-section end portion of the bolster is reinforced by the longitudinal vertical wall 64 extending therethrough, said wall being cut away as at 66 to accommodate the beforementioned lug 60. At each end of the plate 56 is formed a vertical rib 68 conveniently recessed in a transverse slot 70 in the bottom wall of the bolster and extending through the side wall thereof, thus further interlocking the plate member 56 with the bolster, and the vertical rib 68 is continued into the end portion of the plate member 56, said end portion being formed as a vertical web 72 the shape of which may best be seen in the side elevation of Figure 1. Each end portion 72 projects through the rectangular opening 16 of the adjacent column for engagement with friction means mounted in the adjacent window opening 9, said friction means being generally designated 74.

Each friction means 74 comprises inboard and outboard plates 76, 76 and each of said plates is reinforced by the vertical ribs 78, 78 merging with the central hollow stud 80, said plate presenting on its inner surface a flat friction face 82. The bottom edge of each plate 76 may be seated as at 84 on a ledge formed on the adjacent wall of the tension member, said plates being confined by means of spaced lugs 86, 86. Also, said plates are restrained against upward movement by horizontal flanges 88, 88 with end abutments 89, 89 against which the top edges of said plates may abut. Between the spaced friction plates 76, 76 may be confined friction shoes 90, 90 identical in form and interlocked as at 92, 92 at their top and bottom edges by interengaging horizontal lugs, said lugs also forming abutment means for the top and bottom edges of the enclosed end portion 72 and preventing relative vertical movement between the end portion 72 and the surrounding friction shoes 92, 92. Between each friction shoe 90 and the adjacent side of the end portion 72 is confined a rubber spring 94, said spring serving to urge the adjacent shoe tightly into engagement against the adjacent friction surface 82. Each friction shoe 90 is formed at its opposite edges with vertical flanges 96, 96 which may position said shoe with respect to the adjacent friction plate 76. Positioning means for the rubber springs 94, 94 are formed on the opposite faces of the end portion 72 and, likewise, on the opposing faces of each friction shoe 90 as may best be seen at 98, 98 in the sectional view of Figure 3.

In assembling my novel device, the spring group may be positioned on the tension member in the spring pocket 28, the top spring plate positioned thereover, and the interlocking member 56 seated atop the spring group after which the inboard plate 76 may be placed in position at each end of the frame, the friction shoe seated thereagainst with its associated rubber spring, and the end portion 72 of the interlocking member 56 may be placed in abutment with the firstmentioned rubber spring. Thereafter, the additional rubber spring and shoe may be placed in position against the end portion 72 after which the upper end of the outboard plate 76 may be thrust upwardly between the inboard and outboard walls of the compression member and force applied thereto sufficient to permit the lower end of said plate 76 to be slipped into the slot at 84 in the outer wall of the tension member.

It will be understood that the rubber springs 94, 94 will be placed under greater or less compression or varied in composition to produce greater or less friction between the shoes and the plate 76 as may be desired.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a side frame having tension and compression members, and spaced columns forming therewith a bolster opening and spaced window openings, each of said columns having inboard and outboard L-sections spaced to define openings therein aligned longitudinally of said frame, shoulders on each of said L-sections adjacent the upper portions of the columns defining with said compression member a widened portion of said bolster opening of restricted depth, inboard and outboard friction plates mounted in each of said window openings, a bolster extending into said bolster opening and having guide pads on the side walls thereof of less depth than said restricted depth at the top of said window openings and receivable therethrough for positioning between the inboard and outboard portions of said columns for abutment with said shoulders, an interlocking member having a central portion associated with said bolster and having arms extending through said aligned openings, friction shoes mounted on said arms in engagement with said friction plates, and a resilient pad under compression between each friction shoe and the adjacent arm.

2. In a railway car truck, a truss side frame having tension and compression members, and spaced columns defining therewith a bolster opening and spaced window openings, inboard and outboard friction plates on said frame adjacent each column, each of said columns comprising inboard and outboard legs defining openings therethrough aligned longitudinally of said frame, shoulders on said legs adjacent the upper portions of said columns defining with said compression member a widened portion of said bolster opening of restricted depth, a spring group seated in said bolster opening, a bolster extending into said bolster opening and seated on said spring group, an interlocking member recessed in the bottom wall of said bolster, said interlocking member having arms extending through said aligned openings, friction shoes supported on the ends of said arms in engagement with said plates, and guide pads on the side walls of said bolster of height less than said restricted depth insertable through the upper portion of said bolster opening over said shoulders and receivable between the shoulders on opposite legs of each column for abutment therewith.

3. In a railway car truck, a side frame having tension and compression members, and spaced columns forming therewith a bolster opening and spaced window openings, each of said columns having inboard and outbard L-sections spaced to define openings therein aligned longitudinally of said frame, shoulders on each of said L-sections adjacent the upper portions of the columns defining with said compression member a widened portion of said bolster opening of restricted depth, inboard and outboard friction plates mounted in each of said window openings, a bolster extending into said bolster opening with guide pads on the side walls thereof of less depth than said restricted depth at the top of said window openings and receivable therethrough for positioning between the inboard and outboard portions of said columns for abutment with said shoulders, an interlocking member having a central portion interlocked with said bolster, arms extending through said aligned openings, and friction shoes mounted on said arms in engagement with said friction plates.

4. In a railway car truck, a side frame comprising tension and compression members, and spaced columns forming therewith a bolster opening and spaced window openings, said columns having openings therethrough aligned longitudinally of the frame, said bolster opening having a relatively wide upper portion of limited depth defined by shoulders on said columns, a spring group seated in said opening, a bolster extending into said opening and having guide pads on the side walls thereof of vertical depth less than said firstmentioned depth in said window opening and receivable therethrough, said guide pads being normally positioned by the inboard and outboard portions of each column, an interlocking member having a central portion connected to said bolster and end portions projecting through said aligned openings, inboard and outboard friction plates mounted in each of said window openings at opposite sides of each end portion, friction shoes supported on said end portions in engagement with said friction plates, and resilient pads under compression between each end portion and the associated friction shoes.

5. In a railway car truck, a side frame comprising tension and compression members, and spaced columns forming therewith a bolster opening and spaced window openings, said columns having openings therethrough aligned longitudinally of the frame, said bolster opening having a relatively wide upper portion of limited depth defined by shoulders on said columns, a spring group seated in said opening, a bolster extending into said opening and having guide pads on the side walls thereof of vertical depth less than said first mentioned depth in said window opening and receivable therethrough, said guide pads being normally positioned between inboard and outboard portions of each column, an interlocking member having a central portion recessed in the bottom wall of said bolster and end portions projecting through said aligned openings, inboard and outboard friction plates mounted in each of said window openings at opposite sides of each end portion, and friction shoes supported on said end portions in engagement with said friction plates.

6. In a railway car truck, a truss side frame, having tension and compression members, and spaced columns defining therewith a bolster opening and spaced window openings, inboard and outboard friction plates on said frame adjacent each column, each of said columns comprising inboard and outboard legs defining openings therethrough aligned longitudinally of said frame, shoulders on said legs adjacent the upper portions of said columns defining with said compression member a widened portion of said bolster opening of restricted depth, a spring group seated in said bolster opening, a bolster extending into said bolster opening and seated on said spring group, an interlocking member associated with said bolster, said interlocking member having arms extending through said aligned openings, friction shoes supported on the ends of said arms in engagement with said plates, and resilient members under compression between each arm and the associated friction shoes.

7. In a railway car truck, a truss type side frame having tension and compression members, and spaced columns forming therewith a bolster opening and spaced window openings, aligned openings in said columns, inboard and outboard friction plates fixed on said frame in each of said window openings adjacent said columns, a spring group supported on said tension member in said bolster opening, a bolster projecting into said bolster opening, an interlocking member comprising a central portion recessed in the bottom wall of said bolster, vertical end portions extending through said aligned openings in the adjacent columns and between said friction plates at opposite sides thereof, said bolster and interlocking member being supported on said spring group, each of said vertical end portions supporting a plurality of friction shoes for engagement with the friction plates at opposite sides thereof, and resilient pads under compression between each end portion and the supported friction shoes.

8. In a railway car truck, a truss type side frame having tension and compression members, and spaced columns forming therewith a bolster opening and spaced window openings, aligned openings in said columns, inboard and outboard friction plates fixed on said frame in each of said window openings adjacent said columns, a spring group supported on said tension member in said bolster opening, a bolster projecting into said bolster opening, a member having its central portion recessed in the bottom wall of said bolster and seated therewith on said spring group, said recessed member being interlocked with said bolster at spaced points and having end portions extending through said opening in the adjacent columns and between said friction plates, friction shoes supported on said end portions in engagement with said friction plates, and resilient pads under compression between each of said end portions and the supported friction shoes.

9. In a railway car truck, a side frame having tension and compression members, and spaced columns forming therewith a bolster opening and spaced window openings, each of said columns having inboard and outboard L-sections spaced to define openings therein aligned longitudinally of said frame, shoulders on each of said L-sections adjacent the upper portions of the columns defining with said compression member a widened portion of said bolster opening of restricted depth, inboard and outboard friction plates mounted in each of said window openings substantially in alignment longitudinally of said frame with the opposite edges of said aligned openings, a bolster extending into said bolster opening with guide pads on the side walls thereof of less depth than said restricted depth at the top of said window openings and receivable therethrough for positioning between the inboard and outboard portions of said columns for abutment with said shoulders, a member recessed in the bottom wall of said bolster and extending laterally thereof through said aligned openings, and friction shoes mounted on said member and in engagement with said plates.

10. In a railway car truck, a truss side frame having tension and compression members, and spaced columns defining therewith a bolster opening and spaced window openings, inboard and outboard friction plates on said frame adjacent each column, each of said columns comprising inboard and outboard legs defining openings therethrough aligned longitudinally of said frame, shoulders on said legs adjacent the upper portions of said columns defining with said compression member a widened portion of said bolster opening of restricted depth, a spring group seated in said bolster opening, a bolster extending into said bolster opening and seated on said spring group, an interlocking member recessed in the bottom wall of said bolster and interlocked therewith at a plurality of spaced points, said interlocking member having arms extending through said aligned openings, and friction shoes supported on the ends of said arms in engagement with said plates.

11. In a railway car truck, a truss type side frame having tension and compression members, and spaced columns forming therewith a bolster opening and spaced window openings, openings in said columns aligned longitudinally of said frame, inboard and outboard friction plates fixed on said frame in each of said window openings adjacent said columns, a spring group supported on said tension member in said bolster opening, a bolster projecting into said bolster opening, an interlocking member comprising a horizontal central plate portion recessed in the bottom wall of said bolster, and vertical end portions extending through said aligned openings in the adjacent columns and between said friction plates at opposite sides thereof, said bolster and interlocking member being supported on said spring group, each of said vertical end portions supporting a plurality of friction shoes for engagement with the friction plates at opposite sides thereof.

12. In a railway car truck, a truss type side frame having tension and compression members, and spaced columns forming therewith a bolster opening and spaced window openings, openings in said columns aligned longitudinally of said frame, inboard and outboard friction plates fixed on said frame in each of said window openings adjacent said columns, a spring group supported on said tension member in said bolster opening, a bolster projecting into said bolster opening, a member having its central portion recessed in the bottom wall of said bolster and seated therewith on said spring group, said recessed member being interlocked with said bolster at spaced points, and having end portions extending through said aligned openings in the adjacent columns and between said friction plates, and friction shoes resiliently mounted on said end portions in engagement with said plates.

13. In a railway car truck, a truss type side frame, tension and compression members, and spaced columns forming therewith a bolster opening and spaced window openings, said columns comprising inboard and outboard legs defining openings therethrough aligned longitudinally of said frame, inboard and outboard friction panels on said frame adjacent each of said columns, a spring group on said tension member in said bolster opening, a bolster extending into said bolster opening and seated on said spring group, an interlocking member connected to said bolster and having friction arms extending through said aligned openings, and friction shoes mounted on said friction arms in engagement with said panels.

14. In a railway car truck, a side frame having tension and compression members, and spaced columns forming therewith a bolster opening and spaced window openings, each of said columns having inboard and outboard L-sections spaced to define openings therein aligned longitudinally of said frame, shoulders on each of said L-sections adjacent the upper portions of the columns defining with said compression member a widened portion of said bolster opening of restricted depth, and inboard and outboard friction plates mounted in each of said window openings substantially in alignment longitudinally of said frame.

15. A truss side frame having tension and compression members, and spaced columns forming therewith a bolster opening and spaced window openings, each of said columns comprising inboard and outboard legs of L-section defining therebetween openings in said columns aligned longitudinally of said frame, shoulders on said legs adjacent the upper portions of said columns defining with said compression member a widened portion of said bolster opening of restricted depth, and inboard and outboard friction panels in each of said windows removably mounted on said frame adjacent each of said columns, said panels presenting opposed friction surfaces.

16. In a railway car truck, a truss type side frame, tension and compression members, and spaced columns forming therewith a bolster opening and spaced window openings, said columns comprising inboard and outboard legs defining openings therethrough aligned longitudinally of said frame, inboard and outboard friction panels on said frame adjacent each of said columns, a bolster extending into said bolster opening, an interlocking member connected to said bolster and having friction arms extending through said aligned openings, and friction shoes mounted on said friction arms in engagement with said panels.

17. A truss side frame having tension and compression members and spaced columns forming therewith a bolster opening and spaced window openings, each of said columns comprising inboard and outboard legs of L-section defining therebetween openings in said columns aligned longitudinally of said frame, shoulders on said legs adjacent the upper portions of said columns defining with said compression member a widened portion of said bolster opening of restricted depth, and bolster guide surfaces mounted on said frame in said window openings.

18. In a railway car truck, a side frame having tension and compression members, and spaced columns forming therewith a bolster opening and spaced window openings, each of said columns having inboard and outboard L-sections spaced to define openings therein aligned longitudinally of said frame, shoulders on each of said L-sections adjacent the upper portions of the columns defining with said compression member a widened portion of said bolster opening of restricted depth, and friction panels in each of said windows and removably mounted on said frame.

19. In a truss type side frame, tension and compression members, and spaced columns forming therewith a bolster opening and spaced window openings, said columns comprising inboard and outboard legs defining openings therethrough aligned longitudinally of said frame, and oppositely spaced inboard and outboard friction panels removably mounted on said frame in each of said windows.

20. In a railway car truck of quick wheel change type, a side frame comprising spaced columns partly defining windows therein, aligned openings in said columns, oppositely spaced friction panels in certain of said windows mounted on said frame adjacent said columns, a bolster end in another of said windows, said end having a recess in the bottom wall thereof, a member countersunk in said recess and having arms extending laterally of said bolster end through said openings, and friction shoes supported on said arms and in engagement with said panels.

21. A truss side frame having columns, a bolster opening and spaced windows, said columns having openings aligned longitudinally of said frame, and friction panels in said windows, said panels being removably mounted on said frame.

22. In a railway car truck, a truss side frame having columns partly defining windows therein, aligned openings in said columns, friction developing means removably mounted on said frame adjacent each of said columns, a bolster end in one of said windows and means mounted on said end and extending through said openings for actuation of said friction developing means.

23. In a railway car truck of quick wheel change type, a truss side frame having columns partly defining windows therein, aligned openings in said columns, a bolster in one of said windows, a member countersunk in the bottom wall of said bolster having arms extending laterally thereof and through said openings, friction panels mounted on said frame adjacent said columns, and friction shoes mounted on said arms and in engagement with said panels.

24. In a railway car truck of quick wheel change type, a truss side frame having columns partly defining windows therein, openings in said columns, friction developing means removably mounted on said frame adjacent said columns, a bolster in one of said windows and having a bottom wall, a member removably countersunk in said wall extending through said openings and actuating said means.

25. In a railway car truck, a truss side frame comprising a tension member, a compression member, and columns defining therewith a bolster opening and spaced windows, friction developing means in each of said windows comprising friction panels engaged with said frame, friction shoes engaged with respective panels, resilient means engaged with respective shoes, a bolster end in said bolster opening, and a member mounted on said end and connected between said resilient means for actuation of said shoes.

26. In a railway car truck, a truss side frame having columns partly defining windows therein, said columns having aligned openings therein and friction absorbing means removably mounted thereon, a bolster in one of said windows and having a bottom wall comprising engaging means, and means engaged with said engaging means, extending through said openings, and actuating said friction absorbing means.

27. In a railway car truck, a side frame comprising a bolster opening, spaced inboard and outboard friction plates mounted on said frame, a friction shoe associated with each plate, a resilient member urging said shoe into engagement with said plate, resilient means in said opening, a bolster end supported thereon, and an actuator engaged with said end and connected between said resilient members.

28. In a railway car truck, a side frame comprising a bolster opening, spaced inboard and outboard friction plates mounted on said frame, friction shoes associated with respective plates, resilient means urging respective shoes into engagement with respective plates, a spring group in said opening, a bolster end supported thereon, and an actuator engaged with said end and connected between said resilient means for actuation of said shoes through said means.

ROBERT B. COTTRELL.